US012479707B2

(12) United States Patent
Hao

(10) Patent No.: US 12,479,707 B2
(45) Date of Patent: Nov. 25, 2025

(54) CHRISTMAS TREE BUILT-IN LIFTING DEVICE

(71) Applicant: KING TREE HANDICRAFTS (SHENZHEN) CO., LTD., Shenzhen (CN)

(72) Inventor: Xiaopeng Hao, Tianjin (CN)

(73) Assignee: KING TREE HANDICRAFTS (SHENZHEN) CO., LTD., Shenzhen (CN)

( * ) Notice: Subject to any disclaimer, the term of this patent is extended or adjusted under 35 U.S.C. 154(b) by 262 days.

(21) Appl. No.: 18/219,669

(22) Filed: Jul. 8, 2023

(65) Prior Publication Data

US 2025/0011145 A1 Jan. 9, 2025

(51) Int. Cl.
*B66F 11/00* (2006.01)
*A47G 33/06* (2006.01)

(52) U.S. Cl.
CPC .............. *B66F 11/00* (2013.01); *A47G 33/06* (2013.01)

(58) Field of Classification Search
CPC ......... B66F 11/00; A47G 33/06; A47G 33/12; A47G 2033/122
See application file for complete search history.

(56) References Cited

U.S. PATENT DOCUMENTS 2,904,292 A * 9/1959 Clouthier ............... A47G 33/12 248/524
7,914,168 B2 * 3/2011 Oliva ..................... A47G 33/06 362/123
9,577,376 B1 * 2/2017 Tsai ..................... H01R 13/629
10,801,229 B1 * 10/2020 George, Sr. ............. E04H 12/32
10,874,241 B2 * 12/2020 Gallaga .................. A47G 33/12
11,096,510 B2 * 8/2021 Tucker ................... A47G 33/06
12,144,450 B1 * 11/2024 Hao ....................... A47G 33/12
2001/0025393 A1 * 10/2001 Nicolette ............ E04D 13/0765 15/160
2005/0048226 A1 * 3/2005 Gary ...................... A47G 33/06 428/18
2013/0308301 A1 * 11/2013 Chen ......................... F21S 4/10 362/123
2014/0287618 A1 * 9/2014 Chen ......................... F21S 4/10 439/527
2015/0041613 A1 * 2/2015 Ray ........................ A47G 33/12 248/519
2015/0047538 A1 * 2/2015 Ergun ...................... A47B 9/02 248/188.5

(Continued)

*Primary Examiner* — Nkeisha Smith
(74) *Attorney, Agent, or Firm* — Birchwood IP

(57) ABSTRACT

The application provides a Christmas tree built-in lifting device comprising a base, a lifting device fixed on the base. The lifting device comprises an outer tube, an inner tube, a motor, a chain, a coupling, a transmission gear, a chain fixing plate, a driven gear. The Christmas tree lifting device is configured as a built-in chain lifting device, and the motor drives the chain to rotate and then drives the inner tube fixed on the chain to realize lifting. The lifting of this solution is faster and with less noise. The lower end of the built-in chain lifting device is configured as a contact to take power, and the upper end is configured as a contact to transmit power. The multi-stage lifting device can be stacked repeatedly as required, thereby making it more convenient for users to use as required, and the multi-stage lifting device is more convenient for transportation.

2 Claims, 3 Drawing Sheets

(56) References Cited

U.S. PATENT DOCUMENTS

| | | | | |
|---|---|---|---|---|
| 2016/0022081 | A1* | 1/2016 | Cooke | A47G 33/126 248/521 |
| 2017/0196391 | A1* | 7/2017 | Schooley | A47G 33/06 |
| 2018/0028009 | A1* | 2/2018 | Ocegueda Gallaga | A47G 33/12 |
| 2019/0313829 | A1* | 10/2019 | Meger | A47G 33/08 |
| 2020/0234904 | A1* | 7/2020 | McRae | H01H 71/002 |
| 2021/0115691 | A1* | 4/2021 | Williamson | E04H 12/18 |
| 2023/0081805 | A1* | 3/2023 | Hao | H01R 13/512 439/252 |

* cited by examiner

CHRISTMAS TREE BUILT-IN LIFTING DEVICE

TECHNICAL FIELD

The present application relates to the technical field of Christmas tree devices, in particular to a Christmas tree built-in lifting device.

BACKGROUND

Christmas is a traditional Western festival, and it is a very widespread festival around the world, so Christmas trees are essential. Christmas trees are mainly used to decorate the active atmosphere at Christmas, and are commonly used decorative items for families and businesses during Christmas. With the rapid growth of social and economic development, more and more families and businesses buy Christmas trees as store decorations. There are also certain requirements for the height of Christmas trees, which is not conducive to handling, and needs to be designed with a lifting function.

Now it is necessary to solve the problem of the height of the Christmas tree, and there is also a Christmas tree that can be designed to lift. CN217285387U "A kind of novel automatic lifting Christmas tree support" discloses a kind of support, and it has only one telescoping design, cannot stack as required. The sound of the internal screw rod linear propulsion device is loud, and the propulsion speed is slow. Therefore, it is necessary to further improve the Christmas tree lifting device.

SUMMARY

In view of this, the present application provides a Christmas tree built-in lifting device. Aiming at the problems of the prior art, the built-in chain is configured to be pushed and can be stacked and assembled in multiple stages, so as to solve the existing technical problems.

The purpose of the present application is achieved through the following technical solutions:

A Christmas tree built-in lifting device comprising a base, a lifting device fixed on the base, wherein the lifting device comprises an outer tube, an inner tube, a motor, a chain, a coupling, a transmission gear, a chain fixing plate, a driven gear, both the outer tube and the inner tube are hollow tubes, a base output contact is fixedly arranged upward inside the base, and a power-taking contact is fixedly arranged on an inner side of a bottom of the outer tube, an outside of the bottom of the outer tube is fixed on the base and a bottom power-taking contact is electrically connected to the base output contact, and the base output contact is electrically connected to an external power control system;

The motor is fixed inside a lower end of the outer tube and is electrically connected to the power-taking contact on an inner side of the bottom of the outer tube, the coupling is fixed at an output end of the motor and is power-connected with an output shaft of the motor, and the transmission gear is rotatably fixed on a side of the coupling and is power-connected with the coupling;

The chain fixing plate is vertically fixed on an upper end of the coupling; the chain is an annular closed chain, a lower end of the chain meshes with the transmission gear, and an upper end of the chain is rotatably fixed on an upper end of the chain fixing plate by the driven gear;

A fixed tip is provided on an outer side of the chain, the inner tube is movably inserted into the outer tube and sleeved on an outer side of the chain, and a bottom of the inner tube is fixedly connected with the fixed tip of the chain;

An inner tube output contact is fixedly arranged on an inner side of a top of the inner tube, and the inner tube output contact is electrically connected to the power-taking contact on the inner side of the bottom of the outer tube by a wire.

Further, one or more lifting devices are sleeved on the lifting device, the outer tube of an upper lifting device is fixedly sleeved on an upper section of the inner tube of a lower lifting device, and the power-taking contact on the inner side of the bottom of the outer tube of the upper lifting device is electrically connected to the inner tube output contact on top of the inner tube of the lower lifting device.

The beneficial effect of the present application is:

In the present application, the Christmas tree lifting device is configured as a built-in chain lifting device, and the motor drives the chain to rotate and then drives the inner tube fixed on the chain to realize lifting. The lifting of this solution is faster and with less noise. The lower end of the built-in chain lifting device is configured as a contact to take power, and the upper end is configured as a contact to transmit power. The multi-stage lifting device can be stacked repeatedly as required, thereby making it more convenient for users to use as required, and the multi-stage lifting device is more convenient for transportation.

REFERENCE SIGNS

1. Base, 2. Lifting device, 101. Base output contact, 201. Outer tube 201, 202. Inner tube, 203. Motor, 204. Chain, 205. Coupling, 206. Transmission gear, 207. Chain fixing Plate, 208. Driven gear, 209. Electric contact, 210. Fixed tip, 211. Inner tube output contact.

DETAILED DESCRIPTION

Embodiments of the present disclosure will be described in detail below in conjunction with the accompanying drawings.

Embodiments of the present disclosure are described below through specific examples, and those skilled in the art can easily understand other advantages and effects of the present disclosure from the contents disclosed in this specification. Apparently, the described embodiments are only some of the embodiments of the present disclosure, not all of them. The present disclosure can also be implemented or applied through different specific implementation modes, and various modifications or changes can be made to the details in this specification based on different viewpoints and applications without departing from the spirit of the present disclosure. It should be noted that, in the case of no conflict, the following embodiments and features in the embodiments can be combined with each other. Based on the embodiments in the present disclosure, all other embodiments obtained by persons of ordinary skill in the art without making creative efforts belong to the protection scope of the present disclosure.

In order to realize the internal chain push of the Christmas tree lifting device and the multi-stage stacking assembly, the specific content of this application is as follows.

Figure 1:
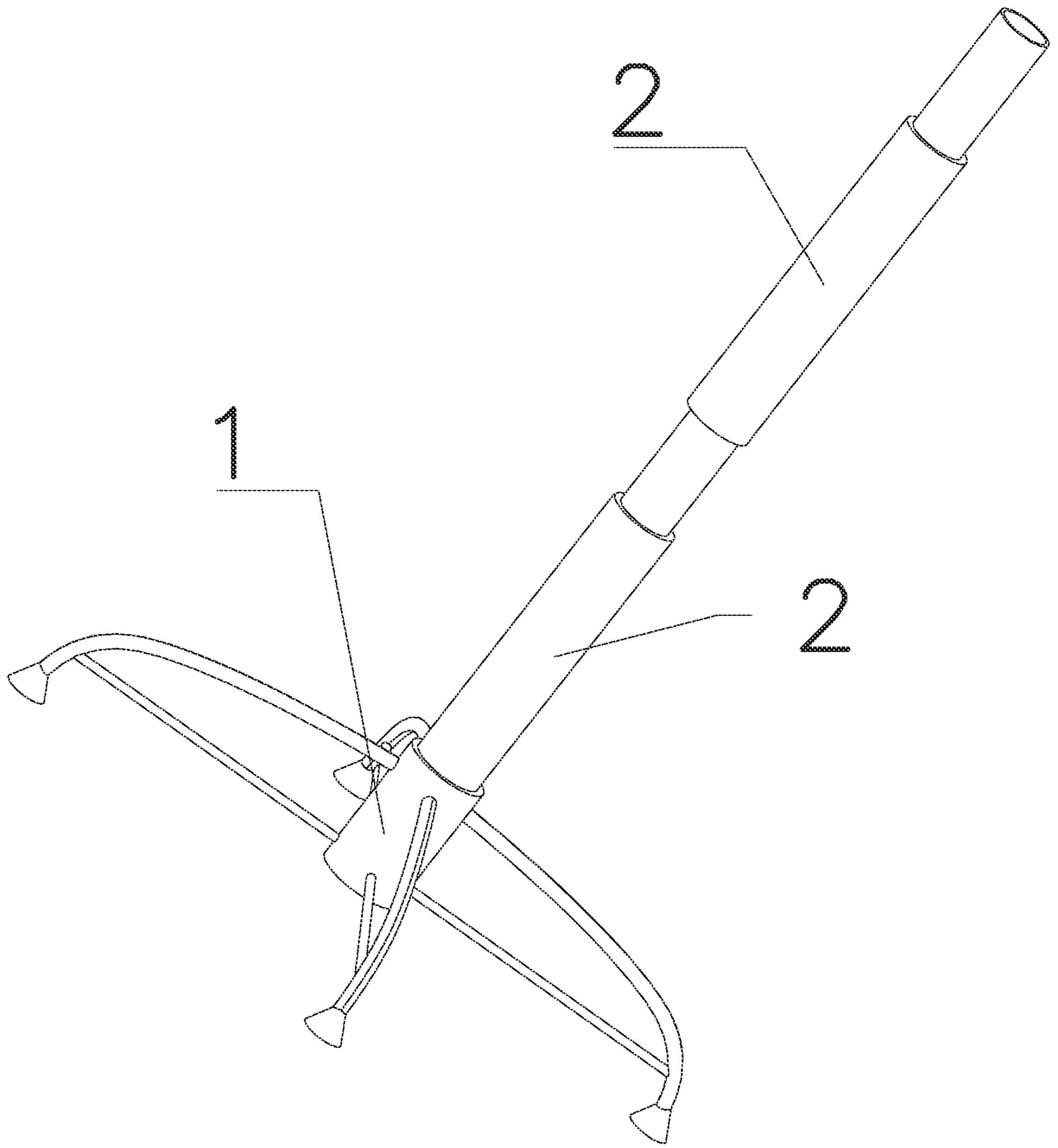
FIG. 1 is a schematic diagram of the Christmas tree built-in lifting device in the present application.
Figure 2:
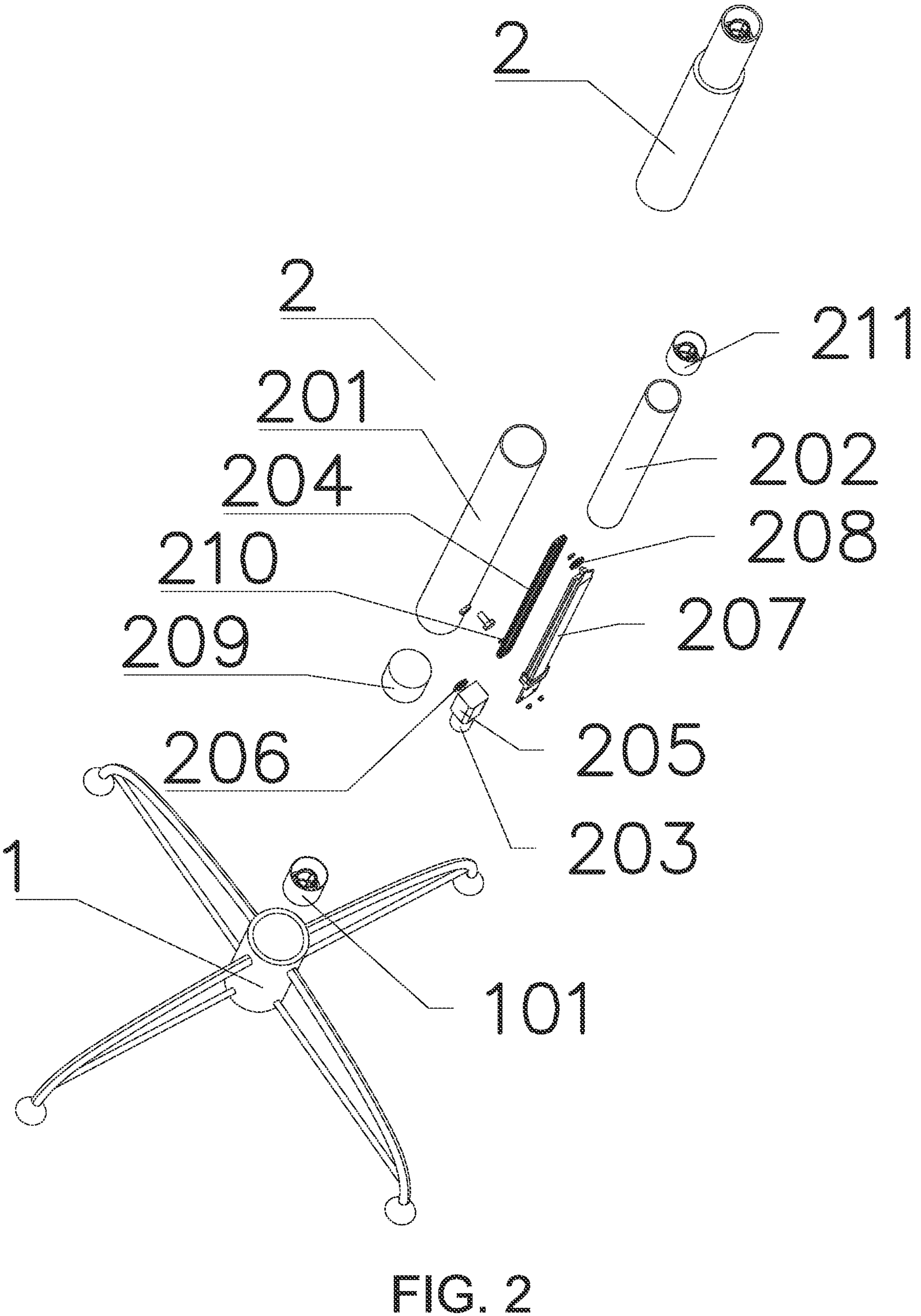
FIG. 2 is an exploded schematic diagram of the Christmas tree built-in lifting device in the present application.
Figure 3:
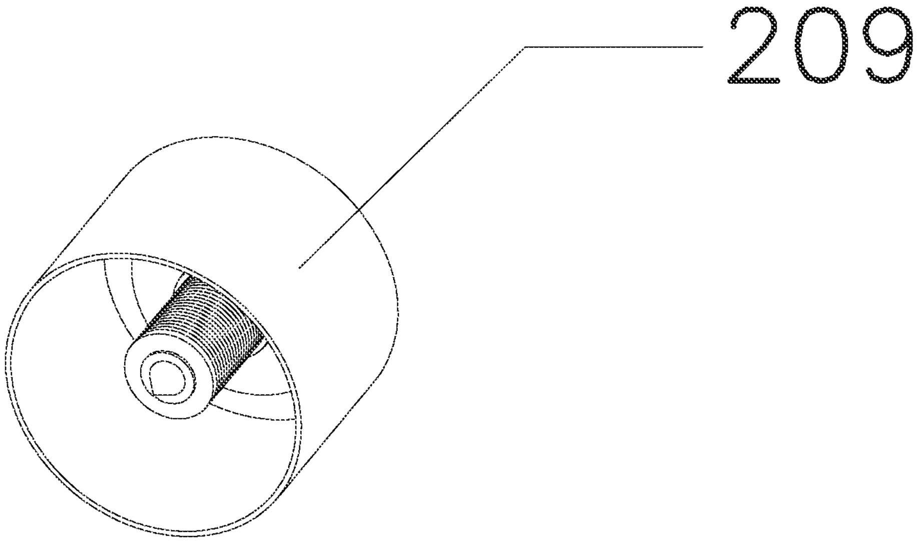
FIG. 3 is a schematic diagram of the electrical contacts in the present application.

As shown in FIG. 1, FIG. 2 and FIG. 3, the embodiment of the present application is a kind of Christmas tree built-in lifting device, comprising a base 1, a lifting device 2 fixed on the base 1

The above is only an illustration of the embodiment of the present application, and is not intended to limit the present application. For those skilled in the art, any modification, equivalent replacement, improvement, etc. within the spirit and principles of the application without creative work shall be included in the protection scope of the application. What is important is that the lifting device 2 comprises an outer tube 201, an inner tube 202, a motor 203, a chain 204, a coupling 205, a transmission gear 206, a chain fixing plate 207, a driven gear 208, both the outer tube 201 and the inner tube 202 are hollow tubes, a base output contact 101 is fixedly arranged upward inside the base 1, and a power-taking contact 209 is fixedly arranged on an inner side of a bottom of the outer tube 201, an outside of the bottom of the outer tube 201 is fixed on the base 1 and a bottom power-taking contact 209 is electrically connected to the base output contact 101, and the base output contact 101 is electrically connected to an external power control system and the external power supply device controls the ON/OFF operation.

The motor 203 is fixed inside a lower end of the outer tube 201 and is electrically connected to the power-taking contact 209 on an inner side of the bottom of the outer tube 201, the motor 203 is energized and controlled by the power-taking contact 209.

The coupling 205 is fixed at an output end of the motor 203 and is power-connected with an output shaft of the motor 203, and the transmission gear 206 is rotatably fixed on a side of the coupling 205 and is power-connected with the coupling 205, the transmission gear 206 is driven to rotate by the motor 203 through the coupling 205.

The chain fixing plate 207 is vertically fixed on an upper end of the coupling 205; the chain 204 is an annular closed chain, a lower end of the chain 204 meshes with the transmission gear 206, and an upper end of the chain 204 is rotatably fixed on an upper end of the chain fixing plate 207 by the driven gear 208; thereby forming a closed power driven by the transmission gear 206 to rotate the chain 204.

A fixed tip 210 is provided on an outer side of the chain 204, the inner tube 202 is movably inserted into the outer tube 201 and sleeved on an outer side of the chain 204, and a bottom of the inner tube 202 is fixedly connected with the fixed tip 210 of the chain 204, so that the inner tube 202 can be lifted up and down with the rotation of the chain 204.

An inner tube output contact 211 is fixedly arranged on an inner side of a top of the inner tube 202, and the inner tube output contact 211 is electrically connected to the power-taking contact 209 on the inner side of the bottom of the outer tube 201 by a wire, so as to provide an electrical connection function for the multi-stage lifting device 2 to realize multi-stage superposition.

By this design, the Christmas tree lifting device is configured as a built-in chain lifting device, and the motor 203 drives the chain 204 to rotate and then drives the inner tube 202 fixed on the chain 204 to realize lifting. The lifting of this solution is faster and with less noise. The lower end of the built-in chain lifting device is configured as a contact to take power, and the upper end is configured as a contact to transmit power. The multi-stage lifting device can be stacked repeatedly as required, thereby making it more convenient for users to use as required, and the multi-stage lifting device is more convenient for transportation.

A further design is, one or more lifting devices 2 are sleeved on the lifting device 2, the outer tube of an upper lifting device is fixedly sleeved on an upper section of the inner tube of a lower lifting device, and the power-taking contact on the inner side of the bottom of the outer tube of the upper lifting device is electrically connected to the inner tube output contact on top of the inner tube of the lower lifting device. Specifically, it is the use method of repeated stacking of multi-stage lifting devices, and the required number of lifting devices 2 can be stacked according to needs.

What is claimed is:

1. A Christmas tree built-in lifting device comprising a base, a lifting device fixed on the base, wherein the lifting device comprises an outer tube, an inner tube, a motor, a chain, a coupling, a transmission gear, a chain fixing plate, a driven gear, both the outer tube and the inner tube are hollow tubes, a base output contact is fixedly arranged upward inside the base, an outside of a bottom of the outer tube is fixed on the base and a bottom power-taking contact is electrically connected to the base output contact;

the motor is fixed inside a lower end of the outer tube and is electrically connected to a power-taking contact on an inner side of the bottom of the outer tube, the transmission gear is rotatably fixed on a side of the coupling and is power-connected with the coupling;

the chain fixing plate is vertically fixed on an upper end of the coupling;

the chain is an annular closed chain, a lower end of the chain meshes with the transmission gear, and an upper end of the chain is rotatably fixed on an upper end of the chain fixing plate by the driven gear;

a fixed tip is provided on an outer side of the chain, the inner tube is movably inserted into the outer tube and sleeved on an outer side of the chain, and a bottom of the inner tube is fixedly connected with the fixed tip of the chain, an inner tube output contact is electrically connected to the power-taking contact on an inner side of the bottom of the outer tube.

2. The Christmas tree built-in lifting device according to claim 1, wherein the power-taking contact is electrically connected to the inner tube output contact.

* * * * *